United States Patent Office 3,486,976
Patented Dec. 30, 1969

3,486,976
GRAPHITE MODERATED NUCLEAR REACTOR
Norman Prince, Culcheth, and Geoffrey Coast, Sandiway, near Northwich, England, assignors to United Kingdom Atomic Energy Authority, London, England
Filed July 24, 1967, Ser. No. 655,625
Claims priority, application Great Britain, Aug. 8, 1966, 35,473/66; June 21, 1967, 28,743/67
Int. Cl. G21c 5/02
U.S. Cl. 176—41                                   3 Claims

ABSTRACT OF THE DISCLOSURE

The radiation top shield of a graphite moderated gas cooled reactor is separately supported on its own diagrid to take the mass of the top shield off the core structure. Preferably the top shield diagrid is suspended below and braces a steel member used to define a reentrant coolant plenum between itself and the top shield. This steel member is preferably a dome which defines between itself and the wall of the pressure vessel a heat exchanger annulus.

---

The present invention relates to a mechanical support structure for a graphite moderated nuclear reactor core and the neutron top shield.

Conventionally the weight of columns of blocks forming to top shield is borne by columns of the graphite moderator which are thus held in compression. The present invention resides in the realisation that this may not be the best method.

According to one aspect of the present invention a mechanical support structure for a graphite moderated nuclear reactor core comprises an integral structure of two spaced diagrids one for supporting the core and the other for supporting the neutron top shield.

Thus even though the columns of the graphite core moderator shrink differentially with irradiation across the core, the top shield is supported on a flat diagrid and does not sag due to the shrinkage. Therefore there is no effective reduction in thickness due to the top shield bellying down as normally occurs and a smaller initial thickness of top shield can be used. Moreover, in reactors for erection in earthquake prone regions, it is essential to counter lateral loads due to the inertia of the fuel stringers, the top neutron shield and the core iself in seismic shock conditions. This countering usually entails the use of an expensive high strength graphite in the top layer of the core but the top shield diagrid will take some of the lateral loads and enable the use of a cheaper graphite in the top layer.

The present invention particularly concerns nuclear reactors in which there is a neutron moderating structure surrounding fuel elements and in which at least part of the coolant is to be passed in one sense before being used in a main coolant stream over the fuel elements in the opposite sense.

Such a reactor is said to have reentrant moderator cooling, a practice pioneered in the British Gas Cooled Reactor Program and used in a particularly advantageous manner in the British Advanced Gas Cooled Reactors (A.G.R.).

In order to define a plenum for the coolant, a metal member penetrated by the fuel element channels or continuations thereof is provided above the core. This member can be a diaphragm extending the full width of the pressure vessel or an inverted cup shaped casing extending down around the reactor core so as to define between it and the wall of the pressure vessel an annular space within which can be disposed heat exchangers. Where a diaphragm is used the heat exchangers could be within pods (or blind ended bores) within the wall thickness of the pressure vessel or could be outside the pressure vessel.

This member has to accept the pressure difference between the circulator outlet and the heat exchanger inlet and if it were to fail it would enable the coolant to bypass the core.

For this reason the member has heretofore been domed but this entails an increase in height, fuel element length, and size of refueling machine.

Another aspect of the present invention provides a nuclear reactor having reentrant moderator cooling in which a metal member that defines a reentrant coolant plenum is integral with and reinforced by a structure supporting a neutron top shield within the reentrant coolant plenum.

The neutron top shield may divide the plenum so that only part of the reentrant coolant passes through the shield with another part of the reentrant coolant joining in between the shield and the core so that all the reentrant coolant passes through the core. Cooling the shield by only part of the reentrant coolant minimises the pressure drop across the shield and enables the shield to be formed with a loose in-fill of graphite pebbles.

An embodiment of the invention will now be described by way of example with reference to the accompanying drawings in which.

Figure 1:
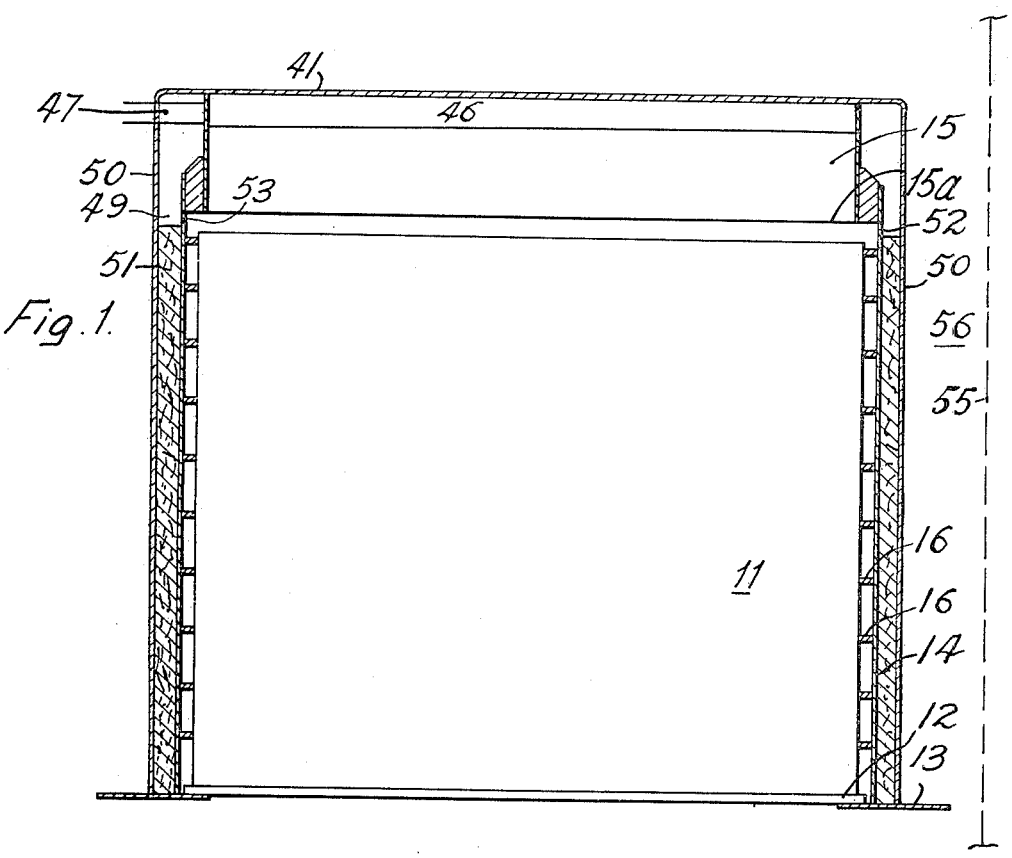
FIGURE 1 is a block outline diagram of a core and a neutron top shield supported by a structure according to the invention.

FIGURE 1 shows a core 11 weighing say 670 tons supported on a diagrid 12 from a flange 13. This flange also carries a restraint ring, hoop or cylinder 14. Above the case there is a top shield diagrid bearing a neutron top shield 15 of say 190 tons weight.

The core 11 consists of a stabilised structure of prismatic blocks of graphite arranged in layers and end to end in columns, some at least of the blocks having through bores which are aligned with other through bores to form channels in which there are fuel element stringers.

The outermost blocks of graphite are secured to the restraint barrel by means of pivoted links 16 in accordance with Belgian Patent 684,757.

The top shield diagrid 15a is an open lattice constructed in egg box fashion (FIGURES 2 and 3) with fillet plates 21 at the intersections of the lattice on the lower face of the diagrid 15a. Each compartment of the lattice can receive a group of four graphite blocks 22 which rest on a local support plate 23 sitting on levelling screws 24 tapped into the fillet plates. The local support plates 23 are ribbed so as to engage in complementary recesses 25 in the bottom of the graphite blocks 22. Horizontal adjustable stops 26 in the form of screws extendable from lugs 27 projecting downwardly from the bottoms of the local support plates are provided for locating the graphite blocks horizontally.

The graphite blocks of these groups support columns of further graphite blocks 28, flat graphite discs 29, which seat in circular recesses 30 in the ends of the graphite blocks, are used to space apart the graphite blocks in a column. A neutron absorbing thermal shield 31 of mild steel plates sits on the neutron top shield.

The graphite blocks in the various columns are offset so as to prevent a straight through path for neutrons, but the central columns have through bores 32 penetrating the blocks and the discs. These bores are straightsided and aligned with the fuel channels in the core. Charge tubes 45 pass through these bores. In service these charge tubes are closed by neutron shield plugs.

Recesses 33 in some of the side faces of the graphite blocks permit a coolant gas to flow through each layer into plenums provided between the discs. These recesses are offset as between the layers, see FIGURE 3 where the recesses in the top layer are between the blocks of the various groups of four but are cut into the upper and lefthand faces (as seen in the drawing) of the lower and righthand blocks whereas in the central layer they are cut into the right and lower faces of the lefthand and upper blocks of the group of four. The gas flows through the bottom layer of the shield between the diagrid and the blocks.

Integral with the top shield diagrid 15a is a shield restraint cylinder 38 which because of the comparative lack of thermal expansion and irradiation distortion in the top shield can be a relatively close fit holding the columns of graphite blocks together; the outer graphite blocks have to be profiled to match up with the restraint cylinder. Encircling the cylinder 38 there is a ring of pockets 39 containing more carbon blocks 40, one layer deep to prevent neutrons streaming over the outside of the cylinder.

Figure 2:
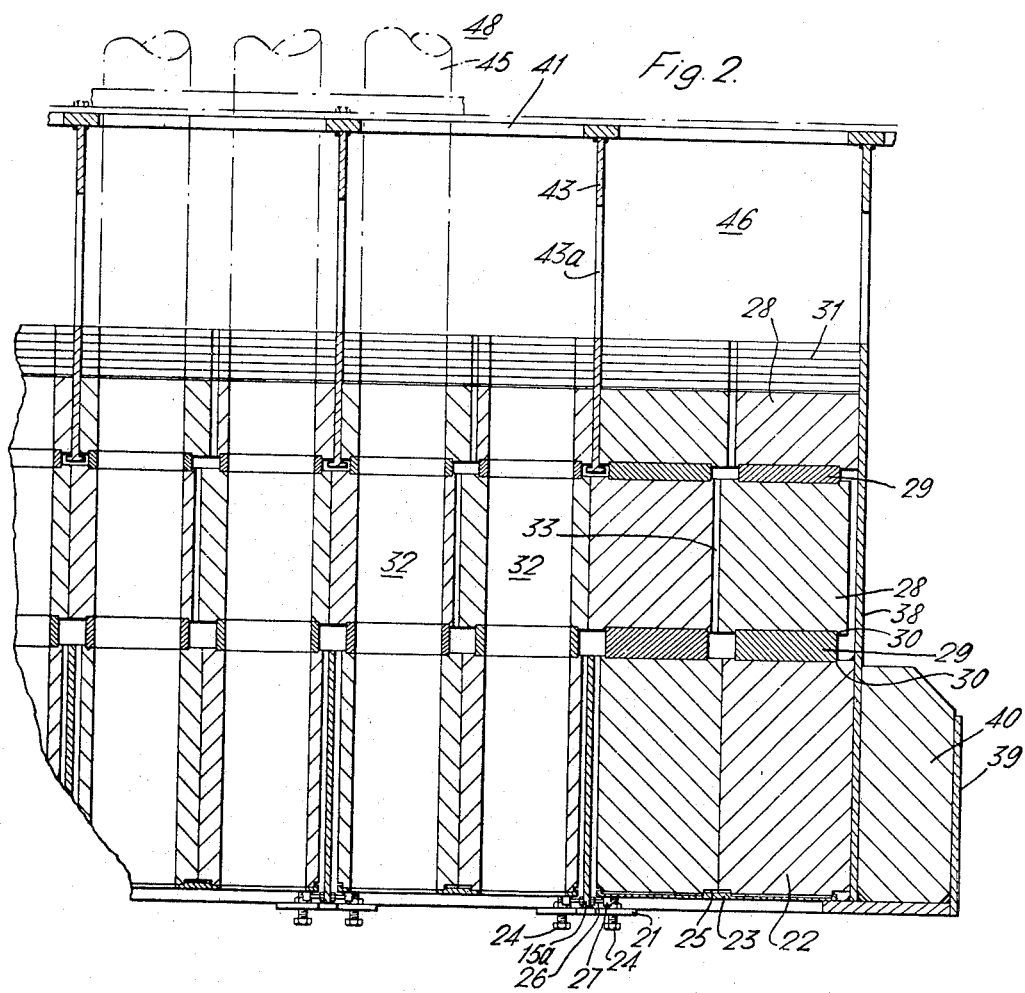
FIGURE 2 is a partial detail view in educational section through the top shield shown in FIGURE 1
Figure 3:
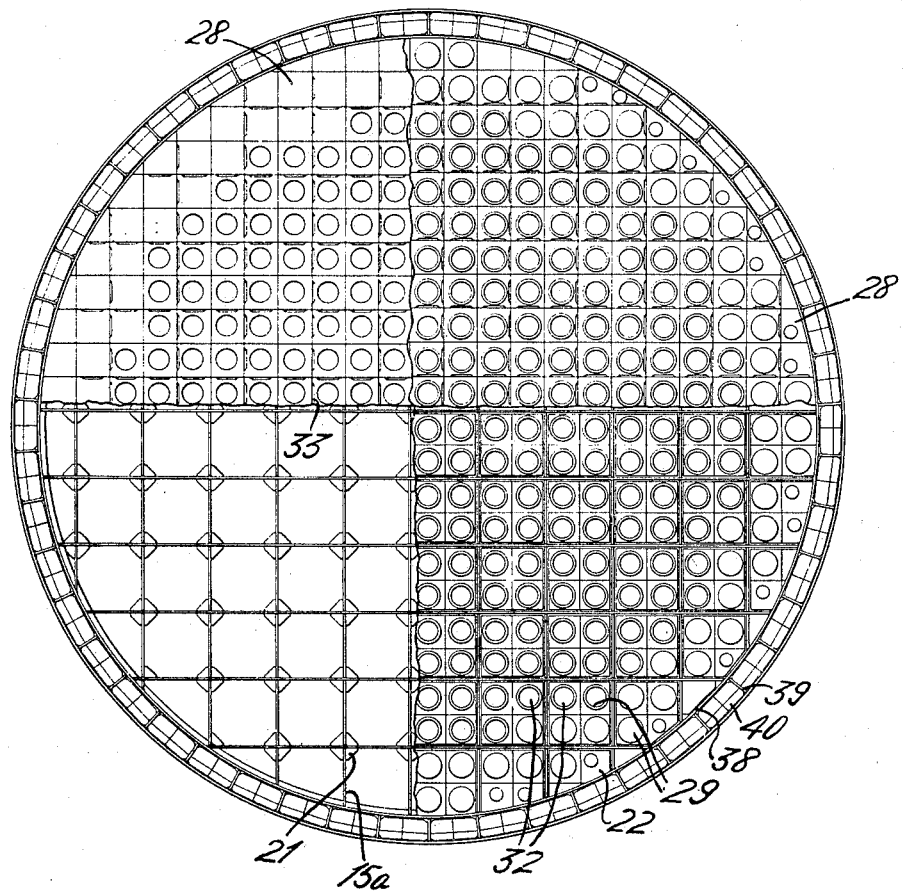
FIGURE 3 is a birds eye view on the top shield with the various quarters showing the progressive removal of layers of graphite blocks starting from the top left hand quarter and going clockwise to the bottom left hand quarter.

The top shield 15 and its diagrid 15a are carried by a metal member 41 illustrated as a substantially flat topped dome. The function of this dome is to divide the vault of a reactor pressure vessel, the wall of which is shown symbolically in FIG. 1, into a core region and an annular space shown symbolically in FIG. 1 at 56 for heat exchangers through which the coolant can be circulated by means of circulators (not shown. The underneath side of the member 41 is reinforced by a square section honeycomb of plates 43 having apertures 43a to allow free gas flow throughout the honeycomb. This honeycomb is integral with both the shield restraint cylinder 38 and the member 41 and has cells of the same size as the compartments of the lattice Through the member 41 extend the charge tubes 45 (only some of which are shown in FIG. 2, broken away and in chain dot) which are extensions of the means (not shown) defining the actual fuel element channels. Bolted connections between the charge tubes and the member 41 provide a fairly good seal. The charge tubes 45 are for guiding fuel into the fuel element channels and also for conducting coolant from the fuel element channels through the member 41 and discharging it in a coolant outlet plenum 48 shown in the drawing as the area above the member 41. Below the member 41, defined by the member 41 and the neutron top shield 15, is a re-entrant moderator coolant plenum 46 with means 47 (FIG. 1) for supplying coolant thereto. Apart from the integration of the top shield diagrid 15a to the member 41 by the shield restraint cylinder, the diagrid 15a can be supported by T-section ties (not shown) disposed in the recesses 33. The space 49 between the skirt 50 of the member 41 and the core restraint cylinder 14 is filled with insulation 51. A web 52 seals between the restraint cylinder 14 and 38. This web can have a metering orifice 53 in it to permit some of the re-entrant moderator coolant to by-pass the top shield 15.

In an alternative construction (not shown) wherein the heat exchangers are contained in ducts in the wall of a concrete pressure vessel the member can be a diaphragm extending across the vault of the pressure vessel.

What is claimed is:

1. A moderating core structure for a graphite moderated nuclear reactor core structure comprising, a core support diagrid, columns of graphite blocks supported on said diagrid, a neutron top shield support diagrid above said graphite blocks, a neutron top shield comprising further columns of graphite blocks overlaid by a neutron absorbing thermal shield and supported on the neutron top shield support diagrid, and a member defining, between itself and the said top shield, a re-entrant moderator coolant plenum, said member and said plenum being penetrated by charge tubes for conducting coolant from channels in the first mentioned graphite blocks through said member and discharging it into a coolant outlet plenum above said member, the said neutron top shield support diagrid being located below the re-entrant moderator coolant plenum and the said member being integral with and reinforced by the neutron top shield support diagrid.

2. A moderating core structure according to claim 1 wherein the said member has a substantially flat top and is reinforced on its underneath side by a honeycomb of apertured plates and wherein the member is generally dome shaped with a skirt for defining between it and the wall of a pressure vessel enclosing the core structure an annular space for heat exchangers.

3. A moderating core structure according to claim 1 wherein a core restraint cylinder encircles the first mentioned graphite blocks and a top shield restraint cylinder encircles the second mentioned graphite blocks, the top shield restraint cylinder forming part of an integral structure comprising the member and the top shield support grid and wherein a web joins the two restraint cylinders.

References Cited

UNITED STATES PATENTS

| 3,159,549 | 12/1964 | Moore et al. | 176—58 |
| 3,164,530 | 1/1965 | Banks | 176—87 |
| 3,238,106 | 3/1966 | Long et al. | 176—55 |

FOREIGN PATENTS

| 880,092 | 10/1961 | Great Britain. |

REUBEN EPSTEIN, Primary Examiner

U.S. Cl. X.R.

176—85, 87